United States Patent [19]

Jenneman et al.

[11] Patent Number: 5,327,967
[45] Date of Patent: Jul. 12, 1994

[54] UTILIZATION OF PHOSPHITE SALTS AS NUTRIENTS FOR SUBTERRANEAN MICROBIAL PROCESSES

[75] Inventors: Gary E. Jenneman; J. Bennett Clark, both of Bartlesville, Okla.

[73] Assignee: Phillips Petroleum Company, Bartlesville, Okla.

[21] Appl. No.: 994,860

[22] Filed: Dec. 22, 1992

[51] Int. Cl.⁵ .............................................. E21B 43/22
[52] U.S. Cl. .................................. 166/246; 166/274; 166/294
[58] Field of Search ............... 166/246, 273, 274, 270, 166/294, 300; 435/253.6

[56] References Cited

U.S. PATENT DOCUMENTS

| | | | |
|---|---|---|---|
| 3,032,472 | 5/1962 | Hitzman | 195/3 |
| 3,844,348 | 10/1974 | Stratton | 166/246 |
| 4,450,908 | 5/1984 | Hitzman | 166/246 |
| 4,460,043 | 7/1984 | Thompson et al. | 166/246 |
| 4,475,590 | 10/1984 | Brown | 166/246 |
| 4,522,261 | 6/1985 | McInerney et al. | 166/246 |
| 4,534,412 | 8/1985 | Dovan et al. | 166/295 |
| 4,552,217 | 11/1985 | Wu et al. | 166/270 |
| 4,558,739 | 12/1985 | McInerney et al. | 166/246 |
| 4,610,302 | 9/1986 | Clark | 166/246 |
| 4,732,680 | 3/1988 | Weaver et al. | 210/610 |
| 4,799,545 | 1/1989 | Silver et al. | 166/246 |
| 4,800,959 | 1/1989 | Costerton et al. | 166/246 |
| 4,905,761 | 3/1990 | Bryant | 166/246 |
| 4,906,575 | 3/1990 | Silver et al. | 435/253.6 |
| 4,941,533 | 7/1990 | Buller et al. | 166/252 |
| 4,947,932 | 8/1990 | Silver et al. | 166/246 |
| 4,971,151 | 11/1990 | Sheehy | 166/246 |
| 4,979,564 | 12/1990 | Kalpakci et al. | 166/273 |
| 4,991,652 | 2/1991 | Hoskin et al. | 166/270 |
| 5,083,611 | 1/1992 | Clark et al. | 166/246 |

Primary Examiner—Stephen J. Novosad
Attorney, Agent, or Firm—Cynthia L. Stokes

[57] ABSTRACT

A novel process for sustaining microbial activity in subterranean formations which comprises introducing as a microbial nutrient, a phosphite salt. This process may include the sequential injection of sources of individual nutrient components which are deficient in said subterranean formation, whereby the injected phosphorus source is selected from the group consisting of a phosphite salt and a phosphorous acid.

9 Claims, No Drawings

UTILIZATION OF PHOSPHITE SALTS AS NUTRIENTS FOR SUBTERRANEAN MICROBIAL PROCESSES

This invention relates to the use of phosphite salts as nutrients in a method for sustaining microbial activity in subterranean formations.

BACKGROUND

In many subterranean microbial processes, nutrient selection and injection are controlling factors to successful operations. The microorganisms utilized must be nutritiously sustained and metabolically active and thus able to achieve their specific objective.

Numerous microorganisms suitable for achieving various microbial objectives in subterranean formations are known in the art. In order to achieve a specific microbial objective, suitable microorganisms can be selected and injected into the subterranean formation. Oftentimes, however, endogenous microorganisms well suited for achieving a particular microbial objective are already present within the formation.

Recently, a method was disclosed by Clark, et el. (U.S. Pat. No. 5,083,611 assigned to Phillips Petroleum Company), which overcame many problems associated with microbial nutrient injection methods then known to the art. This newly disclosed method provides for the sequential injection into a subterranean formation of sources of individual nutrient components which are deficient in the subterranean formation so that a complete nutrient medium capable of sustaining substantial microbial activity is formed in the subterranean formation upon injection of the last nutrient source. Each of the nutrient sources is comprised of at least one of the deficient individual nutrient components. Further, each of the nutrient sources, up to and including the next to the last nutrient source injected, is injected in an amount such that at least one individual nutrient component contained therein is retained in the subterranean formation in an amount sufficient for achieving the desired in-situ microbial objective.

The above method prevents the excessive utilization and depletion of nutrient components by microorganisms located in the vicinity of the borehole and also takes advantage of chromatographic retention in order to achieve nutrient media distribution beyond the proximity of the borehole. However, it has been discovered and disclosed by the present application, that in order to achieve biomass production (i.e. microbial growth and/or exopolymer production) to plug high permeability zones within subterranean formations, a specific phosphorus source when used in the method of U.S. Pat. No. 5,083,611 exhibits greater plugging potential than others presently used. The phosphorus source of the present invention is a phosphite which is used in combination with a carbon source, and provides for an unexpected increase in a capacity for biological activity due to the ability of said phosphorus source to be more easily transported as well as its ability to remain stable during exposure to high temperatures. The ability of the nutrients to be transported in-depth is therefore of great importance. Some problems associated with the use of known phosphorus sources such as inorganic phosphates is their tendency to complex with divalent cations within the reservoir which results in poor solubility and heightened difficulty in indepth transport. Also, inorganic polyphosphates hydrolyze at higher temperatures which render them less soluble in hard brines characterized by such temperatures. Thus, the specific use of phosphite salts as the phosphorus source in the above method, significantly contributes to the art of practicing said method.

It is therefore an object of this invention to provide a phosphorus source for use in the state-of-the art nutrient injection for subterranean microbial processes which provides for greatly enhanced transportability and thermal stability of the phosphorus nutrient.

These and other objects of the present invention will become apparent upon inspection of the disclosure and the claims herein provided.

SUMMARY OF THE INVENTION

In accordance with the present invention, we have discovered that when injected as the phosphorus source in subterranean microbial processes, phosphite salts are more readily transportable than those known in the art and are thermally stable, thus allowing desired biological activity to be achieved.

A process is therefore provided for sustaining microbial activity in subterranean formations which comprises introducing as a microbial nutrient, a phosphite salt.

DETAILED DESCRIPTION

The phosphorus nutrient injection system disclosed herein can generally be used in conjunction with any process wherein microbial activity is induced in a subterranean formation. Examples of such processes include microbial enhanced oil recovery, (MEOR) processes used in oil-bearing subterranean formations, and bioremedtation processes used in aquifers. Typical microbial enhanced oil recovery processes include those wherein microorganisms are used to alter subterranean formation permeability and those wherein microorganisms are used for in-situ generation of chemicals useful for enhanced oil recovery. Examples of in-situ generated chemicals include water-soluble polymers, surfactants, solvents such as ethanol and acetone, acids, carbon dioxide, etc.

The present inventive nutrient combination of a phosphite salt and a carbon source is particularly well suited for use in conjunction with MEOR processes for improving the volumetric sweep efficiency of subterranean formations. Oil-bearing subterranean formations contain porous rock with heterogeneous zones of permeability. Water, used to mobilize oil in a waterflood, preferentially invades the high permeability zones due to these zones' decreased resistance to flow. This causes large reserves of oil, contained in the lower permeability regions, to be bypassed. In microbial enhanced oil recovery processes, nutrients are fed to microorganisms located in high permeability formation zones. The nutrients stimulate the microorganisms and cause the microorganisms to generate an increased biomass. This increased biomass results from cell growth and/or the biological production of polymer(s). Once the high permeability formation zones have been plugged, water is diverted to the previously uninvaded low permeability zones and thereby displaces oil contained in the low permeability zones.

The microorganisms used in conjunction with the present invention are selected for the attainment of a desired microbial objective and then injected into the subterranean formation. Preferably, such microorganisms when used, are injected into the formation prior to nutrient injection. As is known in the art, the particular microorganisms chosen for injection should be tolerant of the conditions, e.g., temperature, pH, salinity etc., existing in the formation. Microorganisms can be injected into subterranean formations using methods which are well known in the art. The preferred microorganism injection method will depend upon the microorganism(s) chosen, and the specific characteristics of the formation. Oftentimes, endogenous microorganisms capable of achieving a desired microbial objective are already present within the subterranean formation. In order to cause the microorganisms within a subterranean formation, whether endogenous or injected, to produce a desired in-situ result, deficient nutrient components are injected into the formation which facilitates the regulation of where, in the formation, a complete nutrient package is formed and hence microbial activity occurs. Deficient nutrient components are those individual nutrient components which are needed by the microorganisms for achievement of a desired microbial objective and which are not already present within the formation in amounts sufficient for achieving the microbial objective. Subterranean formations are typically deficient in either phosphorus, nitrogen, or carbon nutrients, or combinations thereof. Suitable phosphorus sources and nitrogen sources (e.g., ammonium-containing compounds such as ammonium chloride, nitrates such as potassium nitrate, and organic nitrogen sources such as amino acids and peptides), as well as carbon sources (e.g., fats, proteins, simple carbohydrates and complex carbohydrates), and other nutrient sources which are suitable for use in nutrient injection methods are well known in the art. However, selection of a phosphorus source which is sufficiently deficient in carbon and nitrogen and which causes increased in-situ biomass production at depths of penetration where plugging is most desirable is extremely beneficial in the practice of the above method. The inventive use of phosphite salts as the phosphorus source results in an unexpected increase in microbial activity distal from the wellbore due to the ability of the phosphite salt to be easily transported and to maintain a high thermal stability.

The term phosphite salt as used herein, refers to any salt having the general formula X $PO_3$ where "X" represents one or two cations selected from a group consisting of but not limited to $Na_2$, $K_2$, Ca, and Mg, thus forming the respective salts: $Na_2PO_3$, $K_2PO_3$, $CaPO_3$, and $MgPO_3$. The phosphite salt when introduced into a subterranean formation will act as a microbial nutrient and provide the phosphorus needed to sustain microbial activity.

The phosphite salt can be used in a process of injecting microbial nutrients into a subterranean formation comprising the step of sequentially injecting sources of individual nutrient components which are deficient in said subterranean formation. Said process may comprise the steps of injecting a substantially carbon-nutrient-free first nutrient solution comprising a phosphorus nutrient source into said subterranean formation; and thereafter, injecting a substantially phosphorus-nutrient-free second nutrient solution comprising a carbon nutrient source into said subterranean formation. When nutrient sources are sequentially injected into a subterranean formation, the phosphorus source injected according to the present invention, can either be the phosphite salt itself injected, or it can be the phosphite salt derived from the injection of a phosphorous acid of the general formula $H_2PO_3$. This phosphorous acid reacts with cations present in the subterranean formation to form the phosphite salt which is then utilizable by the microbes as a phosphorus nutrient.

The carbon source to be used in combination with a phosphite phosphorus source should be in a substantially phosphorus-nutrient-free solution. Also, the phosphite should be in a substantially carbon-nutrient-free solution, i.e., a solution sufficiently deficient in carbon to render it unusable as a carbon source by the targeted microorganisms. This is to avoid achieving a complete nutrient combination and thus microbial activity prior to locating the nutrients in a position in the subterranean formation where microbial activity is most desired. Therefore it is advantageous to first inject a phosphorus solution of either a phosphite salt or a phosphorous acid which is more readily retained in the subterranean formation and thereafter inject a substantially phosphorus-nutrient-free carbon solution. This permits deep penetration of the phosphorus prior to the injection of the carbon source which has less retainability in the subterranean formation. The carbon nutrient solution, being substantially phosphorus free will ultimately catch up to the previously injected phosphorus solution and form a complete nutrient combination deep within the subterranean formation. Microbial activity will occur where a complete nutrient combination exists and thus where such activity is most desired. Such method is well suited for enhancing oil recovery from oil-bearing subterranean formations.

The following example has been provided merely to illustrate the practice of the invention and should not be read as to limit the scope of the invention or the appended claims in any way.

EXAMPLES

Example I

Three screening criteria were used to determine the preferred use of phosphite compounds vs. inorganic phosphate as sources of phosphorus for biological growth and metabolism. The criteria screened included the ability of the compound to support growth, the adsorption of the compound to rock, and the precipitation of the compound in the brine.

All tests were performed with field brine collected from a skimmer tank at the tract 5 tank battery located at the North Burbank Unit, Osage County, Okla. Burbank brine is typical of many highly mineralized, oil-reservoir brines in that a large percentage of the solids are sodium and calcium salts (Table 1). The temperature of the brine under reservoir conditions is between 40° and 45° C. which is moderate for many oil reservoirs. Brine samples were collected in glass bottles pre-incubated in an anaerobic glove box to remove oxygen, Bottles were capped with a butyl rubber septum. The septum was penetrated with a 22-gauge hypodermic needle attached to a ¼-inch (ID) nylon tubing that was used to transmit the brine sample into the bottle. Bottles of brine were transported back to the lab the same day and placed in the anaerobic glove box.

TABLE 1

Chemical Analysis of Injection Brine from the Tract 5 Tank Battery at the North Burbank Unit

| Analyte | Concentration (g/L) |
|---|---|
| ammonium | .033 |
| nitrate | <.005 |
| nitrate | <.005 |

TABLE 1-continued

| Chemical Analysis of Injection Brine from the Tract 5 Tank Battery at the North Burbank Unit | |
|---|---|
| Analyte | Concentration (g/L) |
| sulfate | .020 |
| phosphate | <.050 |
| total organic carbon | .025 |
| calcium | 6.290 |
| barium | .755 |
| magnesium | 1.250 |
| sodium | 31.000 |
| chloride | 63.000 |
| iron | .0168 |
| total dissolved solids | 127.300 |

Adsorption Screen

Brine was filtered through a 0.22 micron membrane filter and enough phosphite compound added to the brine to get a final phosphorus concentration of approximately 100 mg/L. This solution was added to a serum bottle containing 1 gram of crushed and sieved Burbank rock. The bottle was stoppered with a butyl rubber stopper and placed on a New Brunswick orbital shaker-incubator at 40° C. In a like manner, sodium trimetaphosphate (STMP), an inorganic polyphosphate, was added to another bottle containing crushed rock and brine and incubated at 40° C.

After 72 hours incubation the sample was filtered to remove the rock and the filtrate assayed for phosphorus. The phosphorus was detected using inductively coupled plasma analysis. The phosphorus detected in the filtrate is indicative of the amount of non-adsorbing or non-retained phosphorus compound after equilibration with the rock.

An index was established that compares the efficacy of the test phosphite to an inorganic phosphate, i.e., STMP. STMP was found to be very soluble in this brine as compared to other inorganic phosphates tested (e.g. sodium and potassium phosphates as well as pyrophosphates); however, its propensity to chemically degrade, at the temperature tested, to the highly insoluble orthophosphate made it an unattractive candidate. Therefore, STMP became a standard by which to gauge the effectiveness of other test compounds, that is, effective compounds would have to display properties superior to in terms of adsorption or retention and chemical stability (i.e. precipitation).

The adsorption index (AI) was defined as the amount of STMP phosphorus adsorbed by 1.0 gram of rock at 40° C divided by the amount of phosphite adsorbed per gram of rock at 40° C. An AI greater than 1.0 indicates the test compound relative to STMP is superior in terms of its inability to be retained by the rock. Subsequently, all compounds that were retained less than STMP were considered preferred candidates for transport through the rock matrix. As can be seen in Table 2, both phosphite compounds tested had AIs greater than 1.0.

Precipitation Screen

Samples were prepared as above for the adsorption screen except that no crushed rock was present in the bottles and the samples were held at 40° C. for 23 days instead of 3 days. The long term precipitation index (LTPI) is defined as the weight of dissolved phosphorus in the brine after 23 days divided by the weight of dissolved phosphorus in deionized water after 3 days at room temperature. The LTPI is a measure of the chemical stability of the test compounds. Those compounds that are less likely to precipitate in brine at the higher temperature are those that have LPTIs close to 1.0. Table 2 shows that both compounds tested had LTPIs close to 1.0 and greater than that for STMP. For the purposes of this screen all compounds with LPTIs greater than STMP were considered to be superior and thus preferred compounds.

TABLE 2

| Adsorption and Long Term Precipitation Indices for Phosphite Compounds vs. Sodium Trimetaphosphate | | | |
|---|---|---|---|
| Phosphorus Compounds | Source | AI | LTPI |
| Phosphorous Acid | ROC/RIC | 10.8 | 1.06 |
| Sodium Hypophosphite | Sigma | 65.0 | 0.88 |
| Sodium Trimetaphosphate | Sigma | 1.00 | 0.64 |

Biological Screen

These screens were performed by adding 100 mL of unfiltered Burbank brine to sterile, 120 mL serum bottles. Additions were made in an anaerobic glove box to prevent contamination by oxygen. Glucose was added at a final concentration of 0.1 percent and a phosphorus compound added at a final concentration of 100 micromolar, as phosphorus. The bottles were stoppered with butyl rubber stoppers and incubated at 45° C. for two weeks. After incubation, the bottles were sampled and bacterial numbers determined as acridine orange direct counts (AODC). In addition, the pH of the sample was measured. A lowering of pH along with an increase in cell count is indicative of bacterial fermentation of the glucose. The phosphorus compound was considered to support growth if it could stimulate an increase in bacterial numbers and lower pH to levels comparable to that obtained by using glucose plus STMP. The results in Table 3 indicate that the addition of sodium hypophosphite resulted in a slight reduction in pH and a slight increase in bacterial cell count compared to the control containing no phosphorus source. However when compared to the inorganic phosphate compound, STMP, the hypophosphite did not support comparable growth or metabolism. This should not be unexpected since the ability of microorganisms to use phosphite compounds as phosphorus sources for biological growth and metabolism is not as widespread as the use of phosphate. This is most likely due to the fact that phosphate is the most prevalent form of phosphorus found in nature and it is this form of phosphorus that microorganisms use for assimilation and energy transduction. Reduced forms of phosphorus, i.e., hypophosphite (+1) and phosphite (+3), have to first be oxidized to phosphate (+5) before being utilized. However, numerous soil bacteria capable of oxidizing phosphite compounds to phosphate have been reported. In fact, two organisms, *Pseudomonas fluorescens* 195 and *Serratia marcescens* 24, growing on orthophosphite as a sole phosphorus source, displayed growth rates and cell yields as great as those obtained using phosphate.

Therefore, the capacity of microorganisms to use phosphite compounds and use them in a manner that is as effective as phosphate compounds is known. However, the paucity of these reduced forms of phosphorus in nature suggests that this ability may not be as widespread as phosphate utilization. It may be that the particular habitat used in this example did not contain an effective population of such organisms or conditions were not right for the expression of enzymes needed to effectively use these reduced phosphorus compounds. However, it cannot be concluded that microorganisms do not exist that can effectively utilize phosphites. Therefore, the possibility exists that there are habitats containing such microorganisms.

TABLE 3

Comparison of the Ability of Sodium Hypophosphite vs. Inorganic Phosphate to Support Growth of Bacteria in Burbank Brine after Two Weeks Incubation at 45° C.

| Phosphorus compounds | Source | pH* | AODC ($\times 10^8$)* bacteria/mL |
|---|---|---|---|
| Sodium Trimetaphosphate | Monsanto | 5.0 | 1.5 |
| Sodium Hypophosphite | Sigma | 5.7 | 0.17 |
| No Phosphorus | — | 6.3 | 0.02 |

*averages for two replicates;

That which is claimed is:

1. A process for sustaining microbial activity in subterranean formations which comprises introducing as a microbial nutrient a phosphate salt into said subterranean formations which are deficient in phosphate salt.

2. A process according to claim 1 wherein said phosphite salt is H selected from the group consisting of but not limited to $Na_2PO_3$, $K_2PO_3$, $CaPO_3$, and $MgCO_3$.

3. In a process of injecting microbial nutrients into a subterranean formation comprising the step of sequentially injecting sources of individual nutrient components which are deficient in said subterranean formation, the improvement which comprises using a phosphorus source selected from the group consisting of a phosphite salt.

4. A process according to claim 3 wherein said phosphite salt is selected from the group consisting of but not limited to $Na_2PO_3$, $K_2PO_3$, $CAPO_3$, and $MgCO_3$.

5. A process according to claim 3 wherein said phosphorus nutrient source is a phosphorous acid of the general formula $H_2PO_3$ which reacts within the subterranean formation and gives rise to a phosphite salt which is then utilized as a microbial phosphorus nutrient.

6. In a process for sustaining microbial activity in subterranean formations comprising the steps of injecting a substantially carbon nutrient-free first nutrient solution comprising a phosphorus nutrient source into said subterranean formation; and thereafter, injecting a substantially phosphorus-nutrient-free second nutrient solution comprising a carbon nutrient source into said subterranean formation, the improvement which comprises using a phosphorus nutrient source selected from the group consisting of a phosphite salt.

7. A process according to claim 6 wherein said phosphorus nutrient source is a phosphite salt selected from the group consisting of but not limited to $Na_2PO_3$, $K_2PO_3$, $CaPO_3$, and $MgPO_3$.

8. A process according to claim 6 wherein said phosphorus nutrient source is a phosphorous acid of the general formula $H_2PO_3$ which reacts within the subterranean formation and gives rise to a phosphite salt which is then utilized as a microbial phosphorus nutrient.

9. The process of claim 1 wherein said subterranean formation is an oil-bearing subterranean formation and said process is used to enhance oil recovery.

* * * * *

UNITED STATES PATENT AND TRADEMARK OFFICE
CERTIFICATE OF CORRECTION

PATENT NO. : 5,327,967
DATED : July 12, 1994
INVENTOR(S) : Gary E. Jenneman and J. Bennett Clark It is certified that error appears in the above-indentified patent and that said Letters Patent is hereby corrected as shown below:

Column 7, claim 1, line 21, the word "phosphate" should read ---phosphite---.

Column 7, claim 1, line 22, the word "phosphate" should read ---phosphite---.

Column 7, claim 2, line 24, the letter "H" should be deleted.

Column 8, claim 4, line 3, the formula "CAPO$_3$" should read ---CaPO$_3$---.

Signed and Sealed this

Twenty-sixth Day of September, 1995

Attest:

BRUCE LEHMAN

*Attesting Officer*            *Commissioner of Patents and Trademarks*